(No Model.)

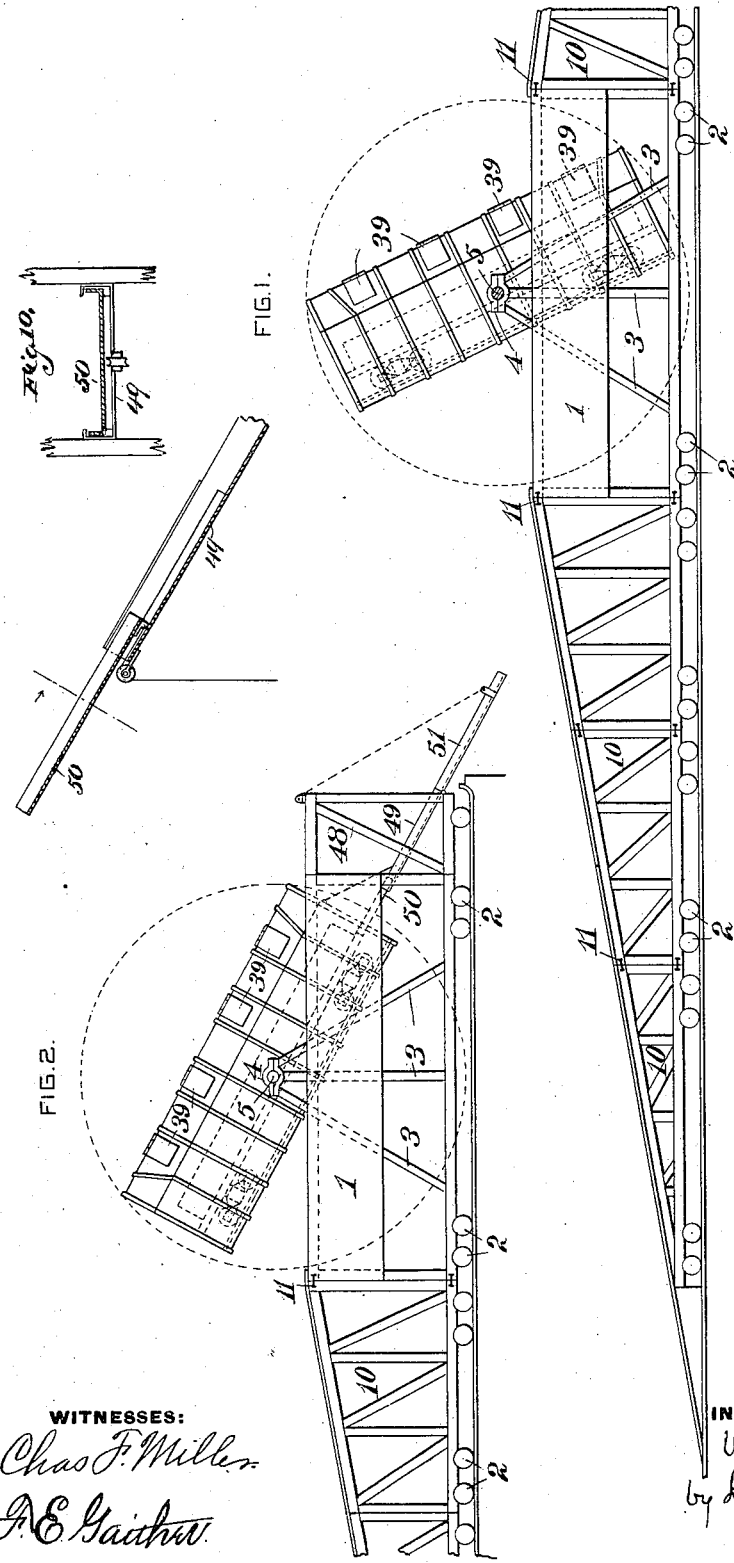

6 Sheets—Sheet 2.

W. R. WILSON.
CAR UNLOADING APPARATUS.

No. 577,500. Patented Feb. 23, 1897.

WITNESSES:
Chas. F. Miller
F. E. Gaither

INVENTOR,
William R. Wilson
by Dennis S. Wolcott
Att'y.

(No Model.) 6 Sheets—Sheet 3.

W. R. WILSON.
CAR UNLOADING APPARATUS.

No. 577,500. Patented Feb. 23, 1897.

WITNESSES:
Chas. F. Miller
F. E. Gaither

INVENTOR,
William R. Wilson
by Darwin S. Wolcott
Att'y.

(No Model.)  6 Sheets—Sheet 4.

W. R. WILSON.
CAR UNLOADING APPARATUS.

No. 577,500.  Patented Feb. 23, 1897.

WITNESSES:
Chas. F. Miller
F. E. Gaither

INVENTOR,
William R. Wilson
by Darwin S. Wolcott
Att'y.

(No Model.)

W. R. WILSON.
CAR UNLOADING APPARATUS.

No. 577,500. Patented Feb. 23, 1897.

WITNESSES:
Chas. F. Miller.
F. E. Gauthur.

INVENTOR,
William R. Wilson
by Darwin S. Wolcott
Att'y.

UNITED STATES PATENT OFFICE.

WILLIAM R. WILSON, OF CARNEGIE, PENNSYLVANIA.

CAR-UNLOADING APPARATUS.

SPECIFICATION forming part of Letters Patent No. 577,500, dated February 23, 1897.

Application filed February 18, 1895. Serial No. 538,841. (No model.)

*To all whom it may concern:*

Be it known that I, WILLIAM R. WILSON, a citizen of the United States, residing at Carnegie, in the county of Allegheny and State of Pennsylvania, have invented or discovered certain new and useful Improvements in Car-Unloading Apparatus, of which improvements the following is a specification.

The invention described herein relates to certain improvements in apparatus for unloading coal-cars, and has for its object a construction whereby a car may be tipped longitudinally to any desired angle or turned entirely over, thereby providing for unloading cars having a discharge-opening in their bottoms, or such as have swinging end-gates, or those which have fixed sides and ends.

In general terms the invention consists in the construction and combination substantially as hereinafter more fully described and claimed.

Figure 3:
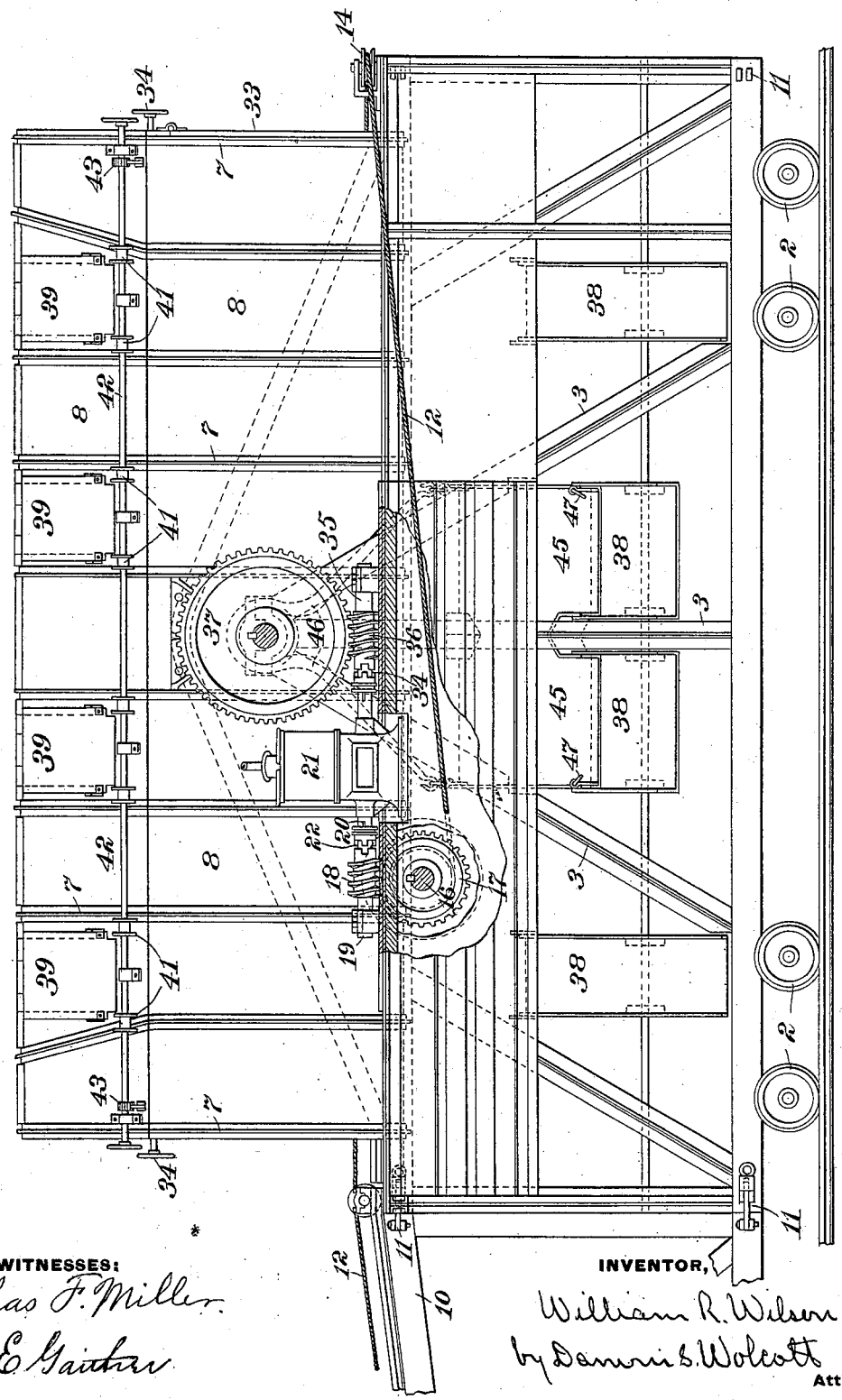
Figure 4:
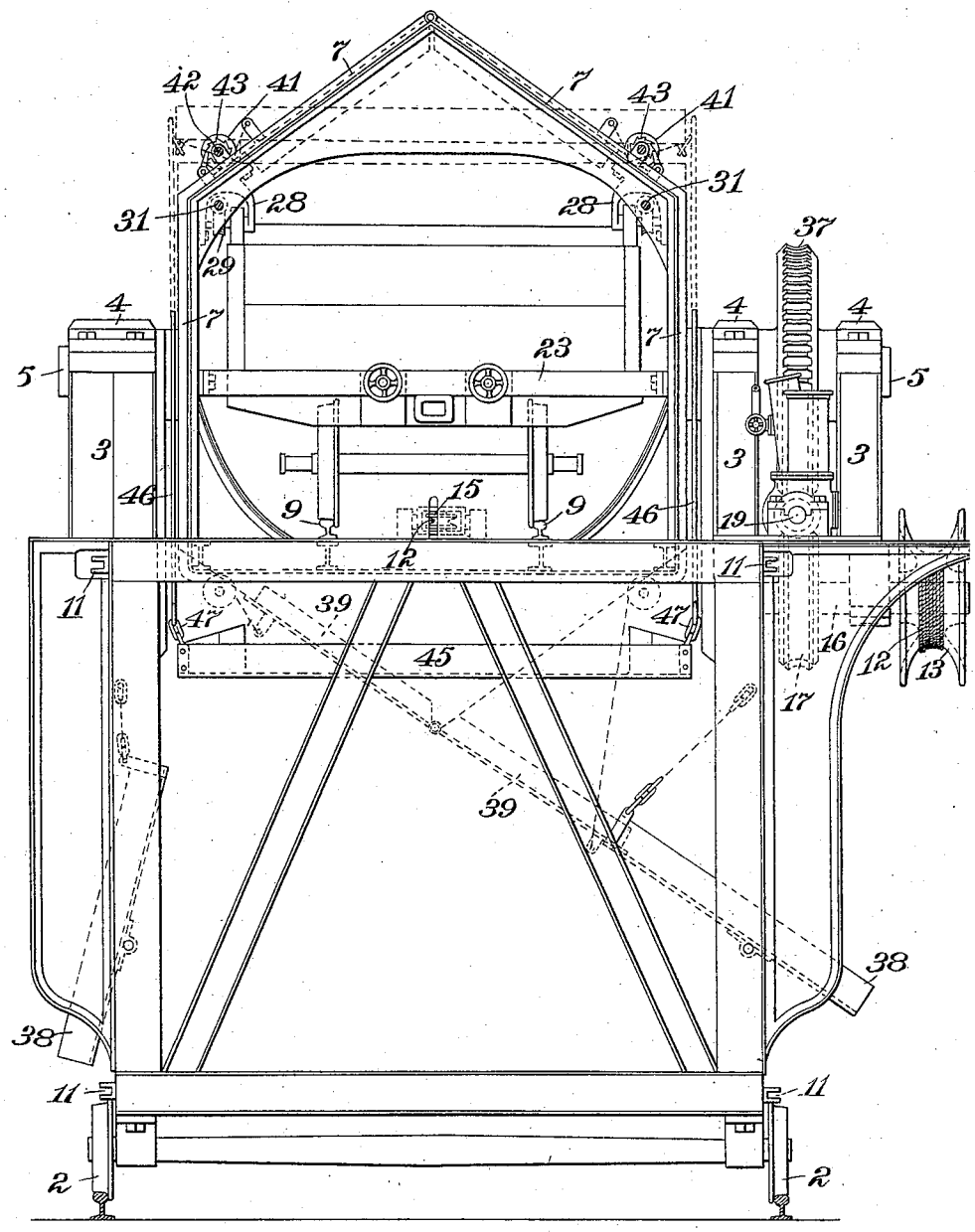
Figure 5:
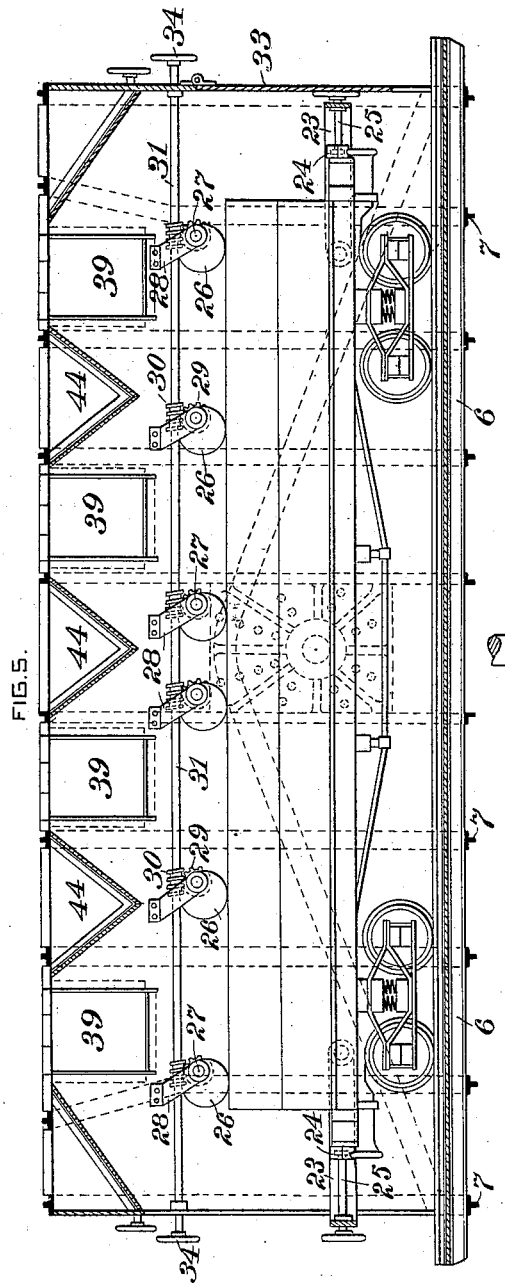
Figure 6:
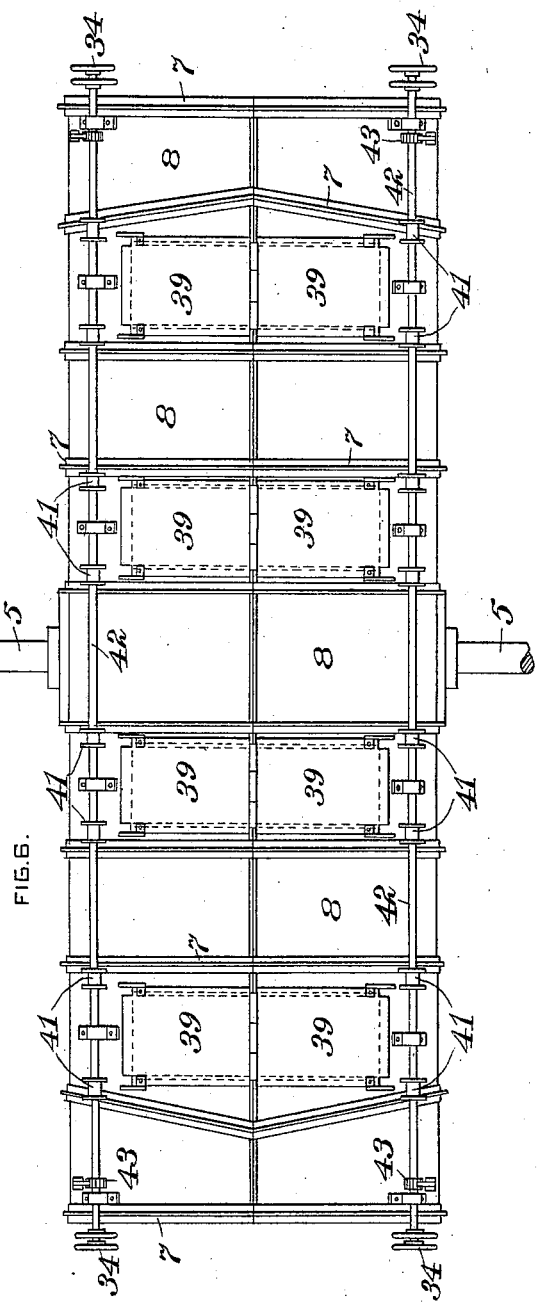
Figure 7:
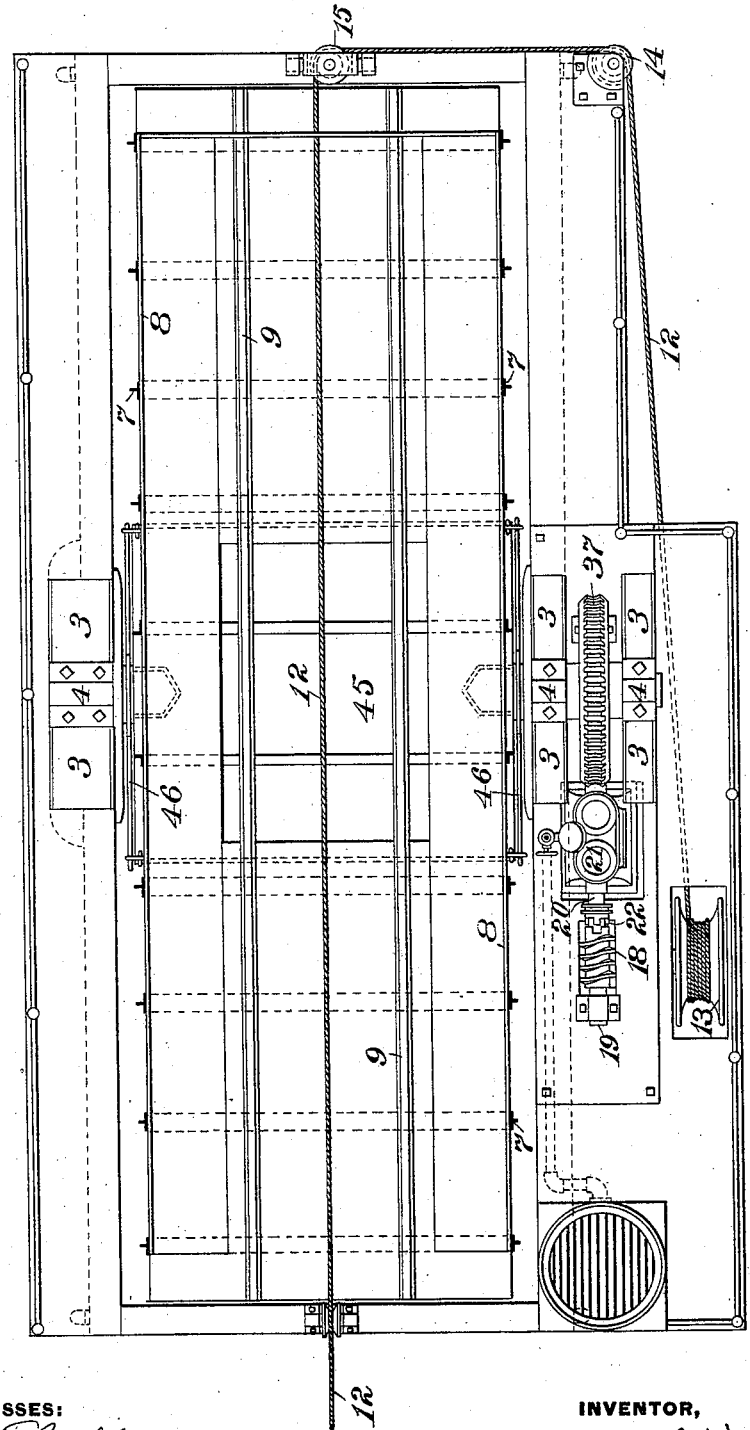
Figure 8:
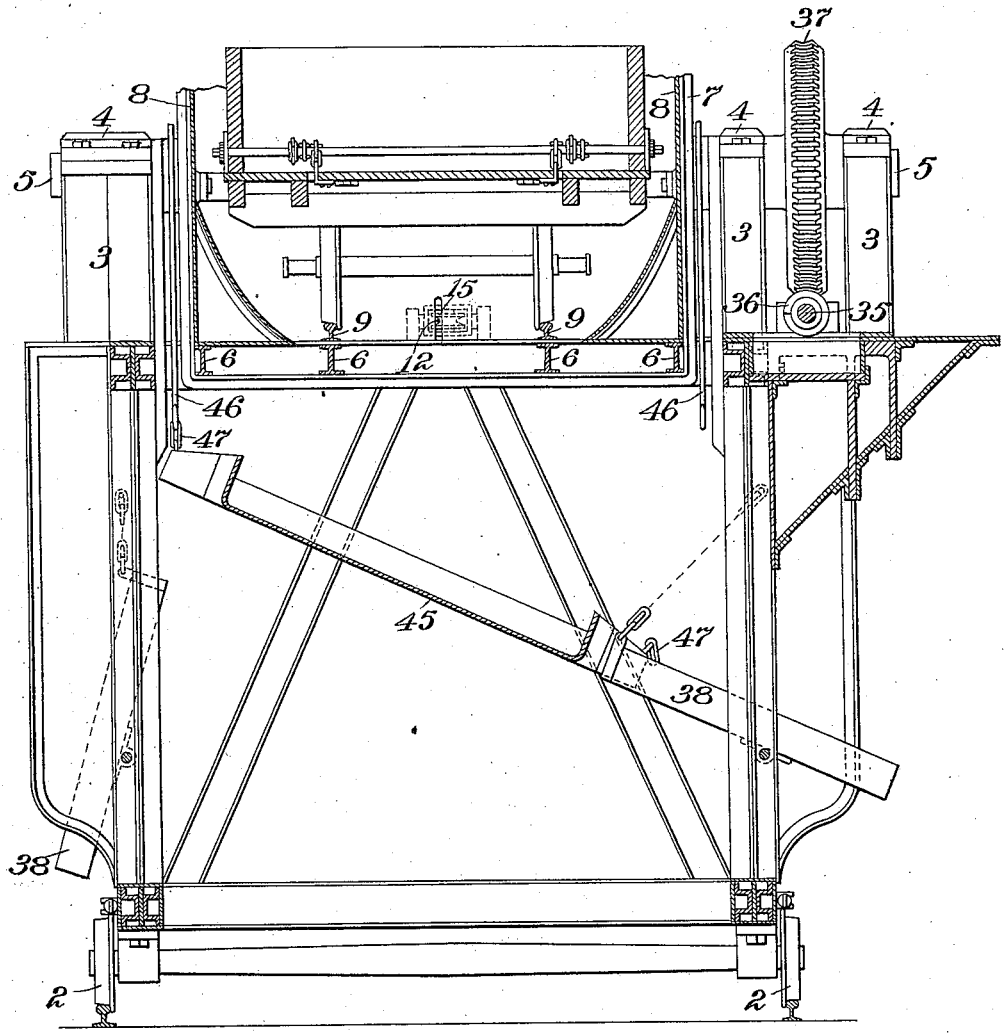

In the accompanying drawings, forming a part of this specification, Figure 1 is a view in side elevation of my improved unloading apparatus, illustrating the manner of shifting the cars to and from the tipping cage. Fig. 2 is a similar view showing the manner of unloading cars having swinging end-gates. Fig. 3 is a side elevation, on an enlarged scale, of my apparatus. Fig. 4 is an end elevation of the same. Fig. 5 is a sectional elevation, and Fig. 6 is a top plan view, of the apparatus. Fig. 7 is a sectional plan; Fig. 8, a transverse sectional elevation of the apparatus, showing the construction employed for unloading cars having discharge-openings in their bottoms. Figs. 9 and 10 are sectional detail views of the end chute shown in Fig. 2.

In the practice of my invention a suitably-braced frame 1 is mounted on trucks 2, so as to permit of its being readily shifted from place to place, and is provided on its sides with struts or braces 3, which support bearings 4. In these bearings are mounted trunnions 5, which are firmly attached to the sides of the longitudinally tipping or rotating cage. The bottom of this cage is preferably formed of I-beams 6, covered by heavy metal sheets or plates, and its sides and top of T-beams 7, the spaces between the beams 7 being filled by metal plates 8, having their edges riveted to the flanges of the beams. On the I-beams 6 are secured rails 9, on which the wheels of the car to be unloaded ride.

In order to get the cars into and out of the cage, which is mounted at such a height as to permit of its endwise rotation through an arc of one hundred and eighty degrees, I provide frames 10, preferably made in sections, having their upper sides inclined and mounted on trucks, so as to be shifted with the cage-frame, as shown in Fig. 1. The sections forming the incline planes or frames 10 are when in use connected together and to the cage-frame 1 by suitable couplings 11, as shown in Figs. 1 and 3. The cars are drawn up the inclines by a rope 12, having one end attached to a winding-drum 13 and passing around guide-pulleys 14 and 15 through the cage to the car to be raised. The guide-pulley 15 is pivotally mounted, so as to permit it to accommodate itself to the change of angle of the rope as the car moves up.

The drum 13 is secured on a shaft 16, mounted in suitable bearings on a platform at one side of the frame, and on this shaft is keyed a worm-wheel 17, meshing with a worm 18 on the shaft 19, which is adapted to be connected, when desired, to the shaft 20 of the engine 21 by any suitable form of coupling mechanism 22, as shown in Figs. 3 and 7. After being unloaded the car can either be permitted to run down the incline at the rear end of the frame 1, under the control of its brakes, or lowered down the incline at its front by the rope 12.

After the car has been run into the cage the yokes 23, having their arms pivotally attached to the sides of the cage, are lowered into line with the end bumpers of the car and the bearing-block 24 forced up against said bumpers by hand-screws 25, passing through the yoke and having a swivel connection with the bearing-block, as shown in Figs. 4 and 5. The car is next clamped onto the rails by means of eccentrics 26 on shafts 27, mounted in hangers 28, secured in such position on the cage that the eccentrics will be in line with the sides of the car, as shown in Figs. 4 and 5. The shafts 27 are provided with worm-wheels 29, which intermesh with worms 30 on shafts 31, running the full length of the cage and provided with hand-wheels 34 outside of the cage. The rotation of the shaft 31 will turn the eccentrics down onto the edges of the sides of the car, firmly clamping the latter on the rails of the cage. The worm-gearing will securely lock the eccentrics in operative position. After the car has been clamped the door 33 at that end of the cage which moves down as the cage is turned is closed and fastened. The cage is then rotated through an arc of one hundred and eighty degrees by the engine 21, whose shaft is detachably connected by a coupling 34 with the shaft 35, having a worm 36 intermeshing with the worm-wheel 37 on one of the trunnions of the cage, as shown in Figs. 3 and 7. After the car has been turned over, as stated, the chutes 38 in the sides of the frame are dropped down to the position shown in dotted lines in Fig. 4, and the doors 39 in the top of the cage are lowered until they rest upon the inner ends of the chutes, thereby permitting the coal which has passed from the car onto the top of the inverted cage to run out and down the chutes. The doors are normally held closed by means of chains or other flexible connection wound upon the drums 41 and having one end attached to the doors, as shown in Fig. 4. These drums are keyed upon shafts 42, arranged in suitable bearings longitudinally of the cage and normally held from rotation by a pawl and ratchet 43. In order to prevent any coal from lodging in the cage, inverted-V-shaped ridges 44 are formed by metal plates between adjacent doors 39, as shown in Fig. 5, the bases of said ridges corresponding in width to the distance between the doors. After the coal has been discharged the doors 39 are closed, the chutes 38 are raised, and the cage turned to original position for the removal of the empty car and the reception of a loaded car. It is preferred to so arrange the trunnions 5 that the center of gravity of the empty cage shall correspond approximately with its center of rotation, thereby facilitating the rotation of the cage with a loaded car, as when so loaded its center of gravity will be above its center of rotation.

In order to adapt the apparatus to the unloading of cars having discharge-openings in their floors, an opening is formed in the floor of the cage, and below this opening is hung a chute 45, which is normally supported by yokes 46, hung on the trunnions 5 and provided with hooks at the lower ends of their arms for the reception of links at 47 at the corners of the chute, as shown in Figs. 7 and 8. After the car has been fastened in the cage, as described, the side chutes 38 are dropped down, and then the end of the chute 45 on the same side of the apparatus is detached from its yoke 46 and lowered until its end rests upon the two middle chutes 38, the large chutes 45 being made of a width sufficient to extend over two adjacent side chutes 38, as shown in Fig. 3. The doors in the bottom of the car are dropped, and the cage is tipped first in one direction and then in the other, so as to cause the coal at the ends of the car to flow to and through the opening in the middle thereof. As the elevated end of the chute 45 is supported by one of the trunnions, the cage can be tipped to a considerable angle without affecting the chute. When not in use, the chute 45 is supported by its yoke and will not interfere with the movements of the cage.

To adapt the apparatus for discharging cars having a movable end-gate, I provide a frame 48, mounted on trucks and adapted to be attached to one end of the frame 1, as shown in Fig. 2. In this frame is arranged a chute 49, provided with a telescopic portion 50, adapted to be shifted so as to project under the floor of a car held in the cage when the latter is tipped to a sufficient angle to cause the coal to flow out at the end of the car. In order to adapt this construction to the loading of vessels at the end or side of a dock, an apron 51 is pivotally connected to the outer end of the chute 49 and can be raised to a vertical position when the unloading apparatus or the vessel is to be shifted.

I claim herein as my invention—

1. In an apparatus for unloading cars, the combination of a frame, a cage pivotally mounted in the frame and capable of being rotated longitudinally through an arc of one hundred and eighty degrees, more or less, means for holding the car stationary during the rotation of the cage, movable chutes in the sides of the frame, and doors in the top of the cage adapted to be placed in line with the chutes when the cage is inverted, substantially as set forth.

2. In an apparatus for unloading cars, the combination of a frame, a cage pivotally mounted in the frame, means for tipping the cage in both directions, means for holding the car stationary during the movement of the cage, an opening in the bottom of the cage, a chute arranged below said opening, and chutes in the side of the frame, the chute under the cage being adapted to be adjusted into line with the side chutes, substantially as set forth.

3. In an apparatus for unloading cars, the combination of a frame, a cage pivotally mounted in the frame, means for tipping the cage, means for holding the cars stationary during the movement of the cage, a frame arranged in line with the cage-frame, a chute mounted in said auxiliary frame, and provided with a telescopic section, substantially as set forth.

4. In an apparatus for unloading cars, the combination of a frame, a cage pivotally mounted in the frame, a series of eccentrics mounted in the cage, and adapted to prevent a movement of the car away from the rails of the cage, means for operating the eccentrics along each side of the cage, simultaneously, and means for preventing a longitudinal movement of the car in the cage, substantially as set forth.

In testimony whereof I have hereunto set my hand.

WILLIAM R. WILSON.

Witnesses:
DARWIN S. WOLCOTT,
F. E. GAITHER.